United States Patent [19]

Haines

[11] Patent Number: 4,813,442

[45] Date of Patent: Mar. 21, 1989

[54] COLLAPSIBLE PROTECTIVE STRUCTURE

[76] Inventor: Erica Haines, 1775 E. Palm Canyon Dr., Palm Springs, Calif. 92262

[21] Appl. No.: 41,098

[22] Filed: Apr. 22, 1987

[51] Int. Cl.[4] .................... E04H 15/00; A45B 23/00
[52] U.S. Cl. .................... 135/98; 135/20 M
[58] Field of Search .................. 135/117, 98, 99, 114, 135/20 M; 49/122, 123

[56] References Cited

U.S. PATENT DOCUMENTS

| 962,339 | 6/1910 | Gregory | 49/122 |
|---|---|---|---|
| 1,801,913 | 4/1931 | Frederick | 135/98 |
| 3,850,186 | 11/1974 | Weber et al. | 135/20 M |
| 3,889,698 | 6/1975 | Roessl | 135/98 |
| 3,902,264 | 9/1975 | Radig | 135/96 |
| 4,011,881 | 3/1977 | Becher | 135/98 |
| 4,433,699 | 2/1984 | Schultes et al. | 135/117 |
| 4,614,059 | 9/1986 | Trampe | 49/122 |
| 4,637,415 | 1/1987 | Dalo | 135/98 |
| 4,685,482 | 8/1987 | Yung | 135/20 M |

FOREIGN PATENT DOCUMENTS 2165818  7/1972  Fed. Rep. of Germany ... 135/20 M

Primary Examiner—David A. Scherbel
Assistant Examiner—Caroline D. Dennison
Attorney, Agent, or Firm—I. Louis Wolk

[57] ABSTRACT

This application relates to a foldable and collapsible protective structure in the form of a canopy supported on a shaft mounted on a supporting base in which a plurality of radially positioned arms are actuated into open or closed position by means of a plurality of braces hinged at one end to said arms and at the other end to a sleeve slidably mounted over said shaft and in which the movement of said sleeve is actuated by an arm attached to said sleeve at the bottom thereof.

1 Claim, 1 Drawing Sheet

COLLAPSIBLE PROTECTIVE STRUCTURE

BACKGROUND OF THE INVENTION

This invention relates to a collapsible and foldable protection against the elements such as sun, rain, hail, etc. as well as protection against falling objects such as may result from storms or earthquakes. The device is designed to be useful both indoors and outdoors, and may be easily stored due to its foldable and collapsible construction and may be easily and readily erected for use.

Conventional sunshades and umbrellas are generally constructed of a flexible fabric covering having a desired circular or polygonal configuration which centrally attached to a post and supported by a wire framework attached to a yoke which is slidable on the post and in which the covering is stretched by raising the yoke upward. Such umbrellas are not provided with suitable heavy coverings to provide protection against falling objects and in any event require a substantial degree of force for erection. In the case of the elderly or infirm a portable structure suitable for a variety of protective uses as described there is a need for such a structure which will have a suitably strong and resistant covering and which can be easily erected preferably by foot pressure by the weight of the user.

SUMMARY OF THE INVENTION

Applicant has invented a foldable and collapsible structure utilizing a reinforced flexible covering supported by a framework which is placed in operative position by means of a foot pedal. The device incorporates a suitable covering and a framework of supporting members attached to and radiating from a central vertical supporting shaft which is mounted upon a floor support standard. This framework is linked to erecting members which are in turn linked to the upper end of a vertical sleeve surrounding said shaft. A foot pedal or handle is affixed to the lower end of said sleeve. The length of said sleeve is less than the length of said shaft by a sufficient extent so that when the sleeve is drawn down by pressure on the foot pedal the erecting members are drawn into a position in which the covering is stretched into open position and when the foot pedal is raised the sleeve and the erecting members move upward of the shaft to collapse and fold the covering. The covering or canopy is formed of material which can be flexed and folded and still provide a reasonable degree of protection against falling objects. One such type of covering would be a multiple layered material such as heavy canvas reinforced by steel wires.

DETAILED DESCRIPTION

A fuller understanding of the invention may be obtained by reference to the accompanying drawing, in which, FIG. 1 is a top plan view of a segment of the covering in open position.

Figure 1:
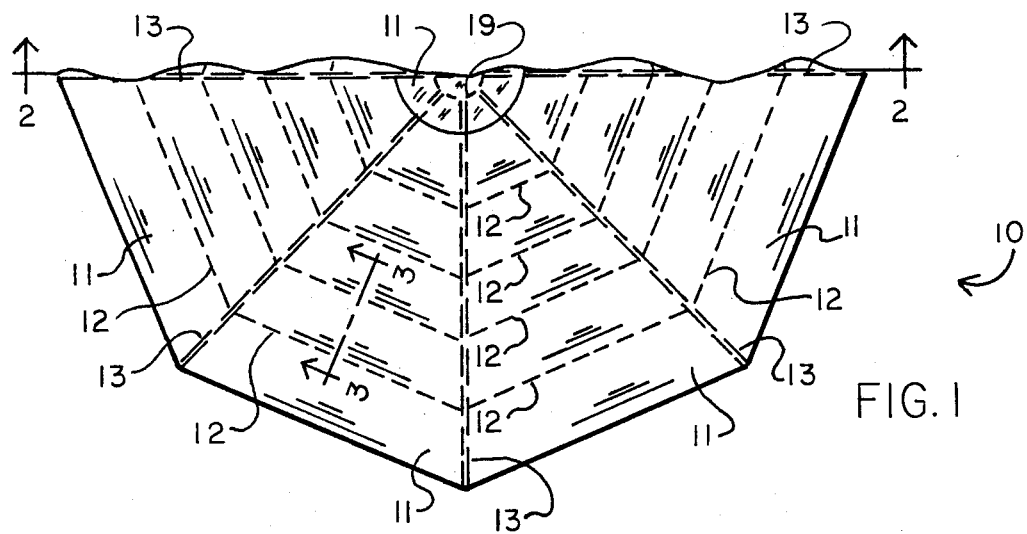
Figure 2:
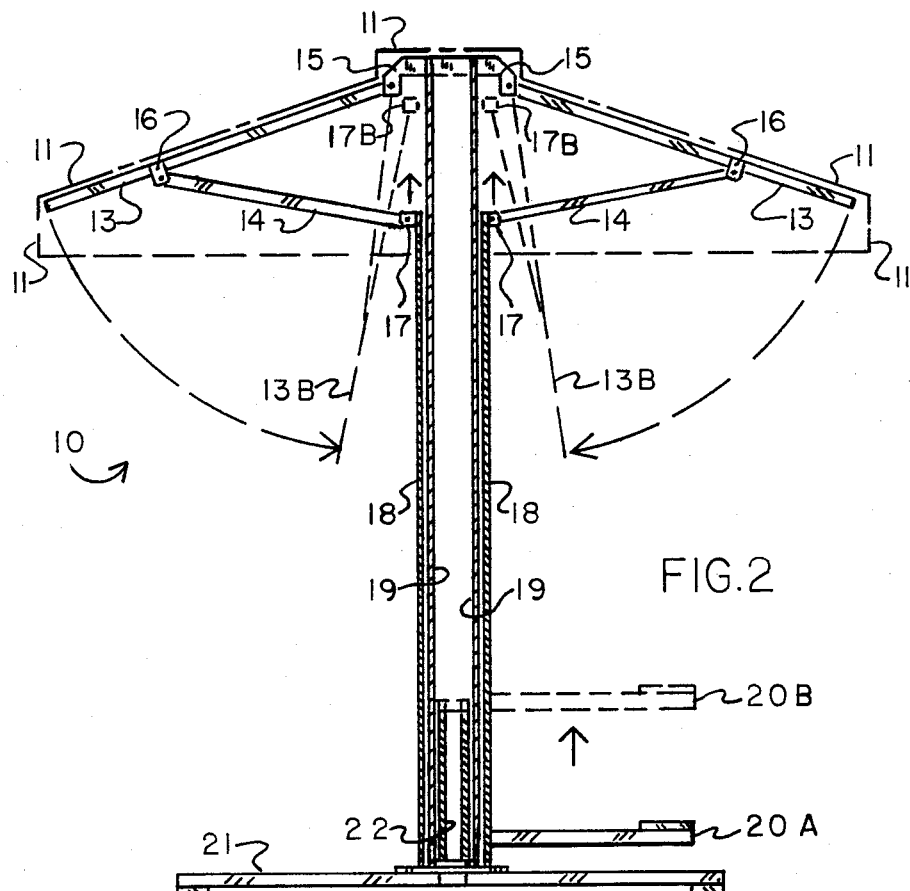
FIG. 2 is a vertical view in partial cross section along lines 2—2 of FIG. 1 showing the structure in open position with its closed position illustrated by dotted lines.
Figure 3:
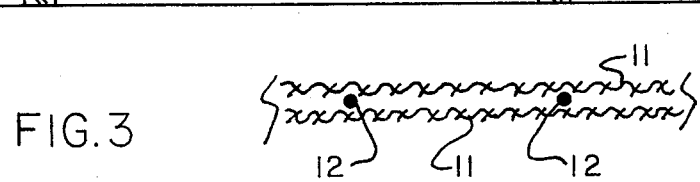
FIG. 3 is a cross section through a portion of the covering along lines 3—3 of FIG. 1.

As shown in the drawings in FIG. 2 the structure 10 of the invention is shown in erected position with covering 11 drawn open. The covering as shown in FIG. 1 is formed of a pair of heavy fabric layers 11 (FIG. 3) reinforced by steel wires 12 embedded between the layers and spaced apart circumferentially as shown or in any other manner which will provide the desired degree of strength and flexibility.

In FIG. 2 the supporting framework for the covering is provided by a plurality of arms or ribs 13 radiating outwardly from a yoke or plate member 15 to which each arm is hinged. These arms are supported by braces 14 hinged to each arm at an intermediate point 16 at a position near the end as shown, and hinged also at the opposite end of each brace at 17 to the upper end of tubular sleeve 18 which surrounds and is vertically slidable over tubular shaft 19 which supports yoke 15 and in turn the covering or canopy supported on arms 13. Shaft 19 is supported at its lower end upon a platform base 21 which may be in the form of a circular platform or crossed supports to the center of which is affixed a short spindle 22 over which the bottom portion of shaft 19 is positioned in a close fitting manner. The shaft may be removable from the spindle for storage of the unit. Sleeve 18 is of sufficient length so that when arms 13 are supported outward in open position, the bottom of the sleeve rests adjacent to the bottom of shaft 19 and supporting spindle 22. This facilitates opening by use of pedal 20A which can be pressed downward as far as the sleeve will go. The covering is affixed by stitching around the arms or by means of metal or plastic clips or the like.

The open position of the assembly is achieved by downward pressure upon pedal 20A attached to the bottom of sleeve 18 as shown in FIG. 2. In this position braces 14 are drawn downward and arms 13 elevated into the desired position to stretch the canopy open.

As shown in FIG. 2, the angular relationship of braces 14 with respect to arms 13 and the upper end of sleeve 18, as determined by the length of the braces and the position of hinges 16 on arms 13, when said sleeve is in the downward position, is such that collapse of the arms and the covering supported thereby is resisted by the cantilever effect created. Further, the downward pressure of the weight of the covering upon the braces at hinges 16 and at hinges 17 by the weight of sleeve 18 and pedal 20 in the downward position as shown contribute to this resistance to collapse. Similarly, when the sleeve 18 is pushed upward the weight of the arms and covering and position of the arms will contribute to retaining the closed condition.

In closed position pedal 20A is raised upward to the position shown in dotted lines at 20B thus raising the sleeve and hinges 17 and braces 14 to the position shown at 17B thus lowering arms 13 to the position shown at 13B and collapsing the canopy.

As described above the folded structure may be stored when not in use and when desired shaft 19 may be slipped over spindle 22 on the platform to place it in upright position. Then by means of a slight downward pressure using the foot or hand upon pedal 20A sleeve 18 is moved downward carrying with it hinged braces 14 and simultaneously raising arms 13 and canopy 11 affixed thereto. The ability to apply foot pressure to the operating pedal is important as it permits the use of a relatively heavy covering and supporting arms and braces. At the same time when it is desired to fold the assembly, the weight of the covering and arms permits the application of only a slight upward pressure upon the operating pedal.

Depending upon the degree of strength and rigidity required the shaft, sleeve, arms and braces may be made of aluminium or steel, while the covering may be of laminated reinforced fabric as referred to above or any other strong flexible sheet plastic material such as polyethylene or polypropylene or similar strong flexible materials.

Applicant anticipates that the device may find special utility for use in case of storms or earthquakes whether indoors or outdoors to protect against falling objects and by providing supplemental protection against falling objects.

I claim:

1. A protective canopy structure comprising—
   (a) a supporting base platform,
   (b) a centrally positioned upwardly extending spindle on said supporting base platform,
   (c) a vertical tubular shaft positioned over said spindle and supported at its lower end by said spindle and by said supporting base platform,
   (d) a yoke affixed to the upper end of said shaft,
   (e) a plurality of arms or ribs hinged to said yoke adapted to extend radially outward therefrom,
   (f) a flexible covering supported by and affixed to said arms or ribs,
   (g) a tubular sleeve surrounding a major length of said shaft and vertically slidable thereover, the bottom end of said sleeve extending adjacent to the bottom of said shaft and upper end of said sleeve extending to a distance spaced from the top of said shaft,
   (h) a plurality of brace members each hinged adjacent to the upper end of said sleeve at one end and to an intermediate point of a supporting arm or rib at the other end, said brace members thus cooperating with said arms or ribs to open or collapse said covering,
   (i) said sleeve having a length such that when it is positioned so that its bottom portion rests adjacent to the bottom of said shaft said arms are supported in outward position to open said covering and when said sleeve is to the top of said shaft said arms and said covering are in collapsed or folded position,
   (j) outwardly extending pedal means affixed to said sleeve adjacent the bottom portion thereof adapted to be engaged with downward and upward pressure to move said sleeve down and up with respect to said shaft, to raise and lower said braces and thereby actuate said arms or ribs and said covering into open and closed positions, respectively.

* * * * *